Figure 1:
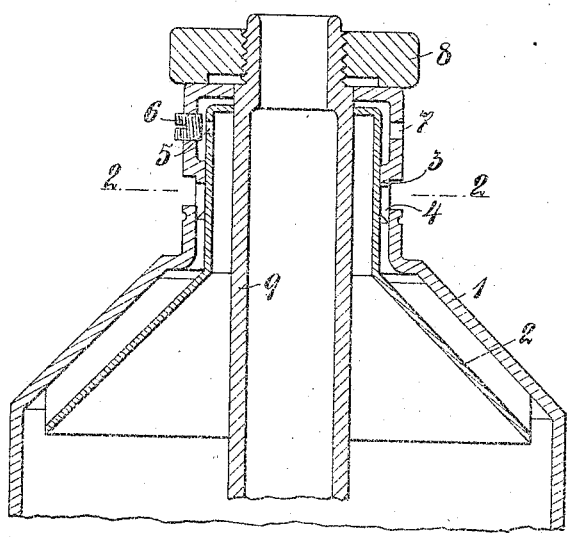

J. V. M. RISBERG & G. W. JOHANSSON.
CENTRIFUGAL LIQUID SEPARATOR.
APPLICATION FILED JULY 12, 1909.

1,003,206.

Patented Sept. 12, 1911.
7 SHEETS—SHEET 1.

J. V. M. RISBERG & G. W. JOHANSSON.
CENTRIFUGAL LIQUID SEPARATOR.
APPLICATION FILED JULY 12, 1909.

1,003,206.

Patented Sept. 12, 1911.
7 SHEETS—SHEET 3.

Witnesses
Chas H. Smith
A. H. Serrell

Inventors
J. V. M. Risberg
G. W. Johansson
by Harold Serrell
their atty.

J. V. M. RISBERG & G. W. JOHANSSON.
CENTRIFUGAL LIQUID SEPARATOR.
APPLICATION FILED JULY 12, 1909.

1,003,206.

Patented Sept. 12, 1911.

7 SHEETS—SHEET 4.

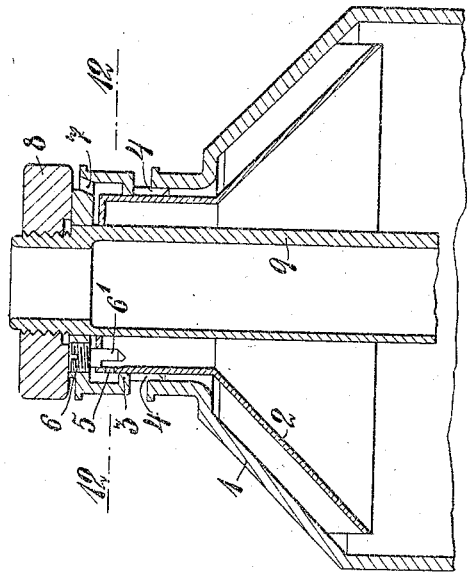
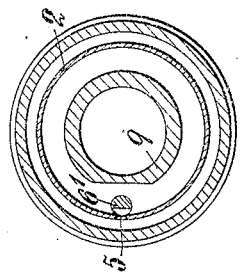
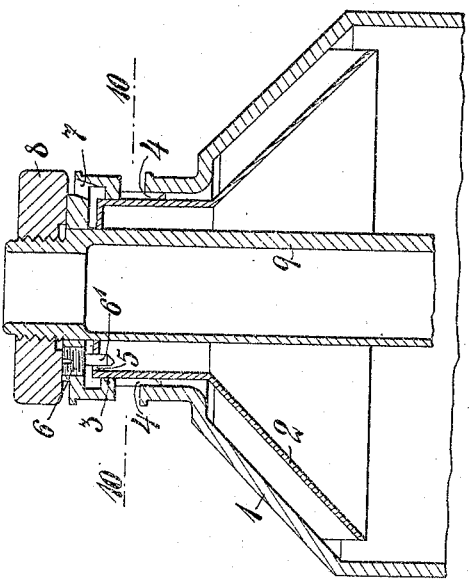
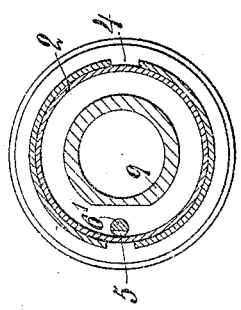

J. V. M. RISBERG & G. W. JOHANSSON.
CENTRIFUGAL LIQUID SEPARATOR.
APPLICATION FILED JULY 12, 1909.

1,003,206.

Patented Sept. 12, 1911.

7 SHEETS—SHEET 6.

J. V. M. RISBERG & G. W. JOHANSSON.
CENTRIFUGAL LIQUID SEPARATOR.
APPLICATION FILED JULY 12, 1909.
1,003,206.
Patented Sept. 12, 1911.
7 SHEETS—SHEET 7.
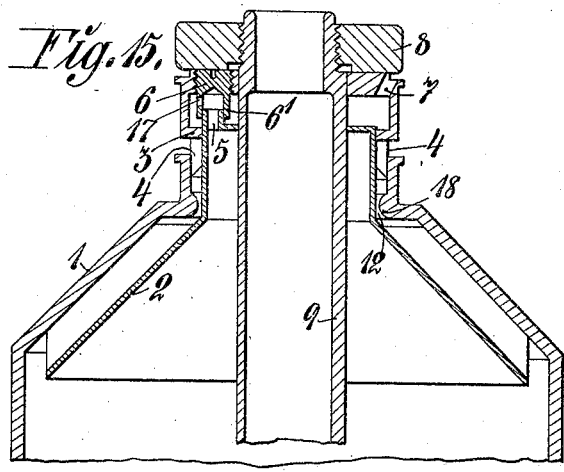
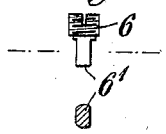
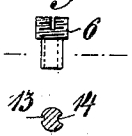
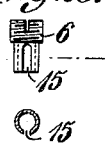
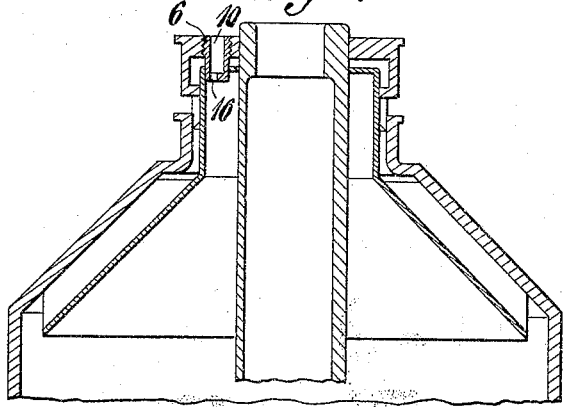
Witnesses
Chas N Smith
A L Serrell
Inventors
J. V. M. Risberg
G. W. Johansson
by Harold Serrell
their atty.

UNITED STATES PATENT OFFICE.

JOHANNES VALDEMAR MÅRTEN RISBERG AND GUSTAF WILHELM JOHANSSON, OF SÖDERTELJE, SWEDEN, ASSIGNORS TO AKTIEBOLAGET BALTIC, OF SÖDERTELJE, SWEDEN.

CENTRIFUGAL LIQUID-SEPARATOR.

1,003,206.

Specification of Letters Patent. Patented Sept. 12, 1911.

Application filed July 12, 1909. Serial No. 507,126.

*To all whom it may concern:*

Be it known that we, JOHANNES VALDEMAR MÅRTEN RISBERG, a resident of Kanalstrand 3, Södertelje, in the Kingdom of Sweden, and GUSTAF WILHELM JOHANSSON, a resident of Östra Badhusgatan 3, Södertelje, in the Kingdom of Sweden, both subjects of the King of Sweden, have invented an Improvement in Centrifugal Liquid-Separators, of which the following is a specification.

In the construction of centrifugal liquid separators it is desirable to arrange for the location of the outlets for the cream and skimmed milk to be as near as possible to the axis of rotation of the drum in order that the power required to operate the separator may be reduced to a minimum. This of course is particularly true in regard to hand operated machines.

One of the objects of our invention is therefore the construction of a centrifugal liquid separator in which both the cream and skim milk discharges of the centrifugal liquid separator are placed relatively close to the axis of rotation of the separator drum.

Another object of our invention is the provision of a means for regulating the discharge of cream and doing this in such a manner that the same is not affected by a relative longitudinal movement of the hood of the bowl when being placed in position, so that this adjustment of the discharge of the cream will remain the same when once fixed, irrespective of whether the hood of the bowl always assumes the same relative position to the bowl with which the same is employed or not.

To accomplish these objects the hood of the bowl and the cover plate are both provided with neck portions of reduced cross section and an adjusting plug is placed in the reduced neck portion of the hood of the bowl and an initial cream discharge orifice is placed in the neck of the cover plate in a position juxtaposed to the plug in the neck of the hood of the bowl, as will be hereinafter more particularly described.

In the accompanying drawings Figures 1, 3, 4, 5 and 7 show in vertical sections different forms of carrying out our invention. Fig. 2 is a section on the line 2—2 of Fig. 1. Fig. 6 is a plan view of the centrifugal liquid separator shown in Fig. 5; the connecting nut is omitted. Fig. 8 is a section on the line 8—8 of Fig. 7. Figs. 9, 11, 13, 14 and 15 show in vertical sections various modifications of the invention. Fig. 10 is a section on the line 10—10 of Fig. 9, viewed from below. Fig. 12 is a section on the line 12—12 of Fig. 11, viewed from below; Figs. 16, 17, 18 and 19 show different forms of the regulating plug.

In Figs. 1 to 15 inclusive, 1 is the hood of the separator bowl, 2 the cover plate; 3 a ring shaped shoulder or contracted part in the neck of the hood 1; 4 the outlet opening for the skimmed milk, 5 an outlet opening for the cream provided in the cover plate, 6 a regulating plug in screw-threaded engagement with the hood; 8 a connecting nut and 9 a central inlet pipe.

Figure 2:
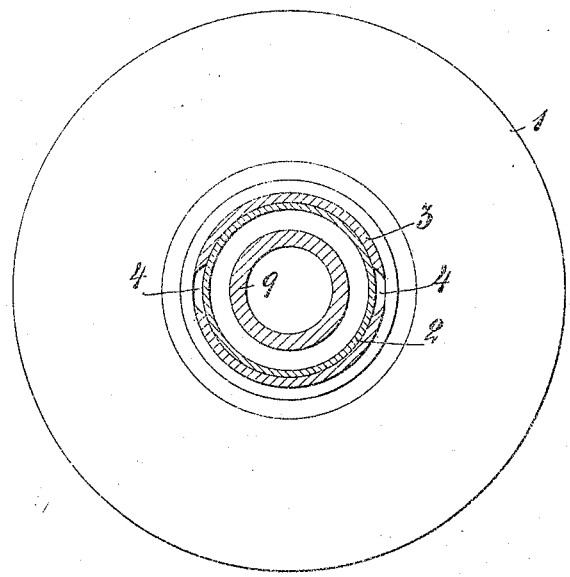

In Figs. 1 and 2 the regulation is effected by the regulating plug 6 mounted in the hood 1 being located in front of the outlet opening 5 for the cream, provided in the cylindrical neck of the cover plate 2. By rotating the plug 6 in one direction or the other the extent of the passage for the escaping cream can be adjusted nicely. In order to prevent both the liquids, separated from each other, from being mingled with one another a shoulder or contracted part 3 is provided in the neck of the hood, below the outlet opening 5 for the cream, the outlet openings 4 for the skimmed milk being provided in the lower part of the contracted part 3.

Figure 3:
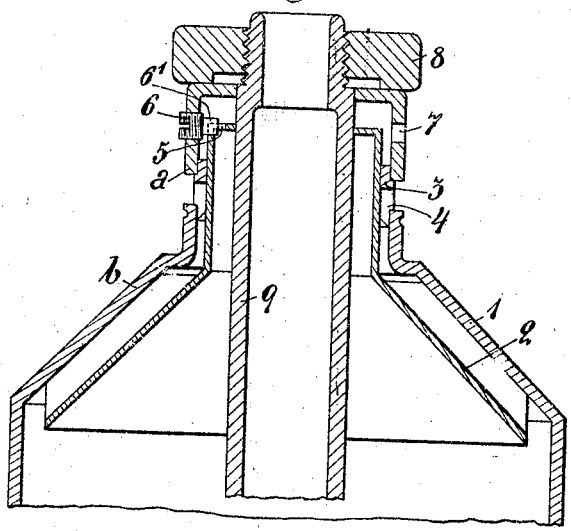

In the form of our invention shown in Fig. 3 the regulating plug 6 has a cylindrical, inward extending part $6^1$ and the outlet opening 5 for the cream in the cover plate 2 is located in the angle between the cylindrical neck of the said plate and the inward extending part of the same and has such a shape, that it can be closed to its full extent by the part $6^1$ of the plug. The contracted part 3 of the neck of the hood 1 is effected by the hood being made in two parts $a$ and $b$, the upper edge of the lower part $b$ forming the shoulder 3 and extending into the upper part $a$. The said parts $a$ and $b$ are soldered together or securely connected in any suitable manner.

Figure 4:
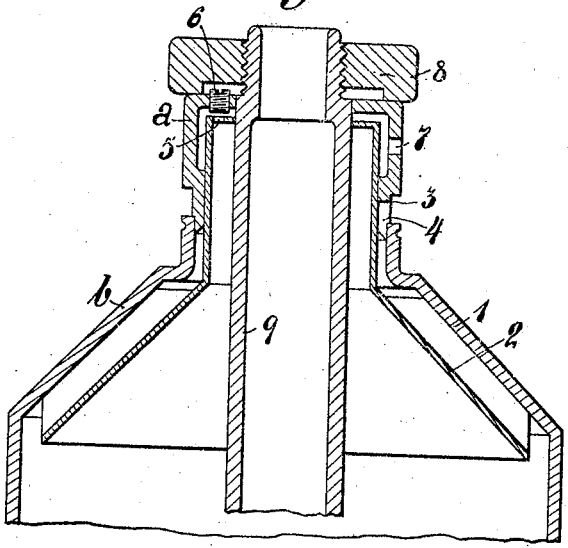

Fig. 4 shows a form of our invention in which the outlet opening 5 for the cream in the cover plate 2 is provided in the inward extending part or top of the said plate and the regulating plug 6 is located in the upper, inward extending part or top of the hood 1. The contracted part or shoulder 3 in the neck of the hood 1 is effected by the contracted lower edge of the top part $a$ of the hood 1 being inserted into the upper edge of the lower part $b$ of the said hood.

Figure 5:
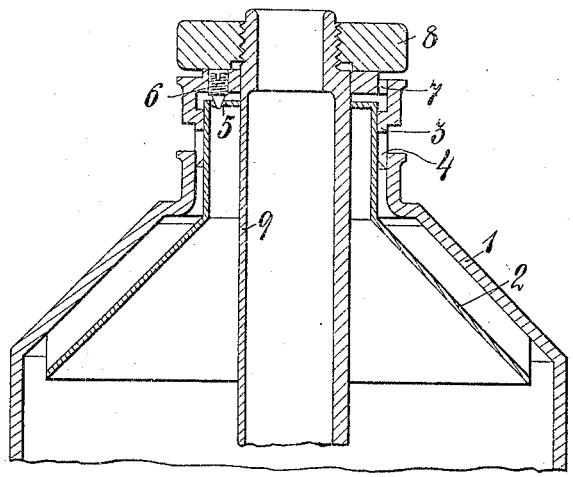
Figure 6:
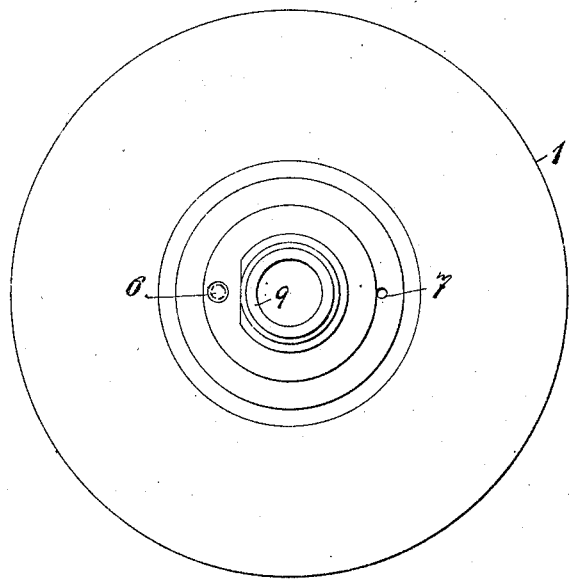

Figs. 5 and 6 show a form of our invention in which the regulation of the discharge of cream is effected in a similar manner to that shown in Fig. 4. The difference consists in a more compact form being effected by the outlet opening 7 for the cream being provided in the inward extending part of the bowl and by a part of the central inlet pipe 9 being cut away longitudinally opposite the regulating plug 6, Fig. 6, a reduction of the diameter of the neck of the bowl being thereby made possible. This plain longitudinal flattened surface of the central tube also serves as a guide for the hood as well as for the cover plate and the liner plates.

Figure 7:
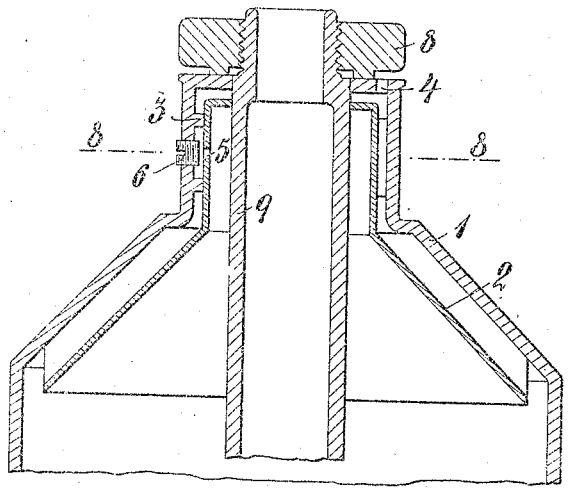
Figure 8:
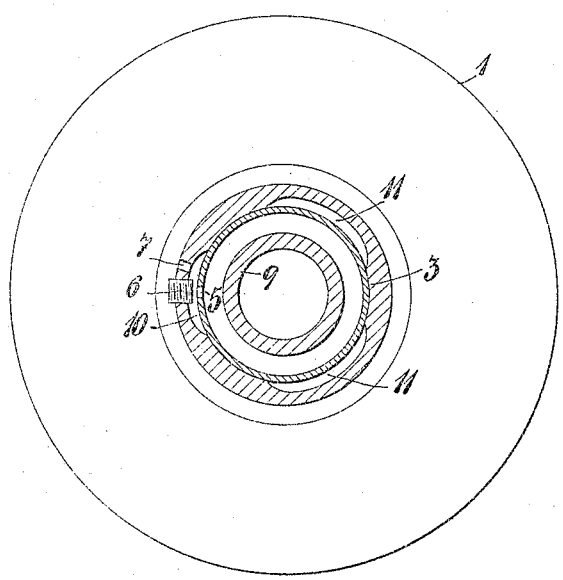

In Figs. 7 and 8 the regulation is effected by a plug 6 provided in the side wall of the hood, as in Figs. 1 and 2, but the outlet opening 5 for the cream in the cover plate is provided opposite to the contracted part 3 of the neck of the hood and the outlet openings 4 for the skimmed milk are located above the outlet opening for the cream. For that reason a cavity 10 is provided in the inner side of the neck of the hood, around the regulating plug 6, into which the cream passes before escaping through the opening 7. The skimmed milk passes to the outlet openings 4, through channels 11 provided in the contracted part 3.

In Figs. 9 and 10, which show the preferred form of our invention, the regulating screw threaded plug 6 in the hood 1 is provided with an inward extending part $6^1$, preferably cylindrical, which extends through the outlet opening 5 for the cream provided in the cover plate, the said part $6^1$ being cut away longitudinally at one side. By rotating the plug 6 in one direction or the other the space between the part $6^1$ and the side wall of the opening 5 is moved nearer to or farther from the vertical center line of the centrifugal bowl or is located to a less or greater extent inside the cream zone, the quantity of the escaping cream being thus decreased or increased accordingly.

In the form of our invention shown in Figs. 11 and 12, the cylindrical extended part $6^1$ of the regulating plug 6 is cut away longitudinally only for a part of its length. The top of the said part $6^1$ fits in an opening provided in the inward extending top part of the cover plate 2. The outlet opening 5 for the cream in the cover plate is provided in the cylindrical top part of the same. By rotating the plug 6 the outlet opening 5 is closed to a greater or less extent, or is entirely closed.

Figure 13:
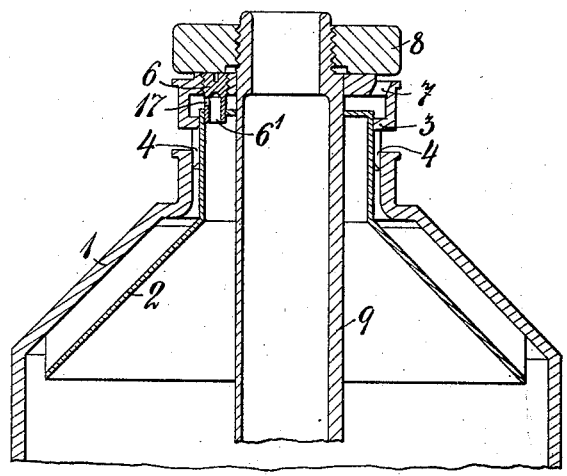

In the form of execution shown in Fig. 13, the regulation is effected by the part $6^1$ of the plug 6 extending into the cover plate 2, being made hollow and outside the said plate 2 provided with one, (or more) side opening 17 for the escaping cream. When the regulating plug is rotated the side opening 17 in the same is located at a greater or less distance from the vertical center line of the bowl, the quantity of the escaping cream being thus varied in the same manner as in Figs. 9 and 10.

Figure 14:
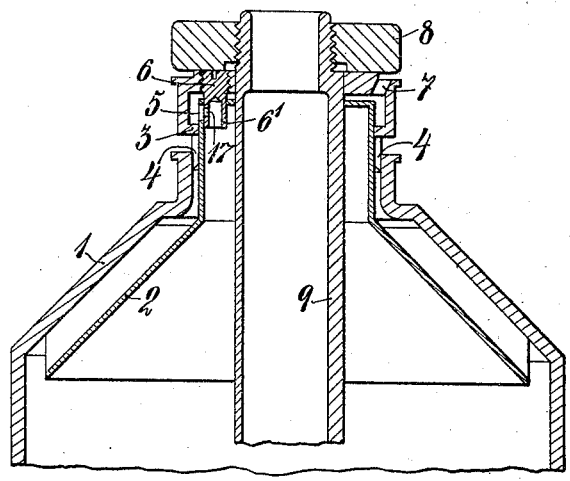

Fig. 14 shows a form of the invention, which differs from the form shown in Fig. 13 by the fact, that the hollow inward extending part $6^1$ of the regulating plug 6 extends beyond an outlet opening 5 for the cream provided in the neck of the cover plate 2, the said part $6^1$ being provided in its side wall with an opening 17, located opposite the outlet opening 5. The regulation is effected by so rotating the plug, that the opening 5 is closed to its whole or partial extent.

Fig. 15 shows a form, in which the hollow inward extending part $6^1$ of the regulating plug 6, provided with the outlet opening 17, incloses a nipple 5 provided on the cover plate 2 and forming the outlet opening for the cream. By rotating the plug 6 the distance of the outlet opening 17 from the vertical center line of the bowl is increased or decreased and the regulation thus effected. Fig. 15 also shows an arrangement by means of which the skimmed milk is prevented from being mingled with the cream. In the constructions of the centrifugal bowl shown in the figures before mentioned there is the disadvantage in order that the location of the cream zone be sufficiently near to the center line of the bowl, the outlet openings for the skimmed milk sometimes must be made so narrow, that the chamber below the contracted part 3 is filled with skimmed milk, which results in the said milk squeezing between the said part 3 and the neck of the cover plate 2 and being mingled with the cream, provided that the part 3 does not fit snugly around the neck of the cover plate 2, which it does not always do. The said disadvantage is removed by providing the outer cap 1 with a further contracted ring shaped part 18 below the part 3, between which and the neck of the cover plate 2 a space 12 is left. By adapting the width of the said space the position of the cream zone is evidently regulated. Owing to the said arrangement the outlet openings 4 may be made so wide, that the chamber below the contracted part 3 is not filled with skimmed milk and consequently no milk will pass between the contracted part 3 and the neck of the cap 2. The contracted part 18 may extend to the said neck, if outlet channels for the skimmed milk are provided in the said part.

Fig. 16 shows a regulating plug 6, the part 6¹ of which is cut off at opposite sides and to different extents radially, so that the plug can easily be adjusted for leaving a passage for a greater or less quantity of cream escaping from the bowl. This arrangement may be substituted by the arrangement shown in Fig. 17, in which the regulating plug is provided with two longitudinal grooves 13 14 of different depths.

Fig. 18 shows a regulating plug 6 which is adapted to the bowl shown in Fig. 14 and the inward extending cylindrical hollow part 6¹ of which is provided with a slot 15, instead of an opening 10 as shown in Fig. 14.

Fig. 19 shows a regulating plug 6, provided with a channel 17 for the cream extending through the whole plug. One part 16 of the said channel 17 has an eccentric position with relation to the rotary axis of the plug. The said plug acts in the same manner as the plug shown in Fig. 9.

It will be seen that the moving longitudinally of the regulating plug shown in Figs. 9 to 15 inclusive and 18, has no influence upon the regulation of the outlet opening for the cream. Consequently a slight changing in the position of the cover plate vertically with relation to the hood will not effect in any degree the regulation of the said opening. Owing to the said fact also an ordinary un-screw threaded plug may be used.

We claim as our invention:—

1. In a centrifugal liquid separator and in combination, a separator bowl, a hood therefor provided with a milk discharge opening, a plug in the walls of the said hood, and a cover plate having a cream discharge opening therein in a position juxtaposed to the said plug, which is adjustable to regulate the flow through the said cream discharge opening in the cover plate.

2. In a centrifugal liquid separator and in combination, a separator bowl, a hood therefor provided with a milk discharge opening, a plug in the walls of the said hood, a cover plate having a cream discharge opening therein in a position juxtaposed to the said plug, which is adjustable to regulate the flow through the said cream discharge opening in the cover plate, and a central intake pipe leading through said hood and cover plate.

3. In a centrifugal liquid separator and in combination, a bowl, a hood for the bowl, a cover plate, the said cover plate and hood both having reduced neck portions, the one fitting within the other, a central intake pipe leading through the said hood and cover plate, and an adjustable plug placed directly in the walls of the neck portion of the hood in a juxtaposed position to the cream discharge opening in the neck of the cover plate so that the flow of cream through said opening is dependent upon the distance between the same and the adjacent portion of the plug.

4. In a centrifugal liquid separator and in combination, a hood for the separator bowl, a cover plate, the said hood and cover plate both having reduced neck portions fitting the one within the other, a central intake pipe leading through the said hood and cover plate and an adjusting plug in the walls of the neck portion of the said hood, the neck portion of the said cover plate being provided with a cream discharge opening in a position juxtaposed to the said plug, the said central intake pipe being provided with a flattened portion to permit of the said discharge opening being placed close to the axis of rotation of the separator.

5. In a centrifugal liquid separator and in combination, a hood for the separator bowl, the said hood having a reduced neck portion, a cover plate, said cover plate having a reduced neck portion fitting within the reduced neck portion of the said hood in such a manner as to provide separate cream and skimmed milk chambers between said parts, and an adjustable plug in the walls of the reduced neck portion of the said hood, there being a cream discharge aperture provided in the walls of the reduced neck portion of the cover plate in a position juxtaposed to that of the said plug, so that the position of the plug in the hood regulates the flow of cream through the opening in the said cover plate.

6. In a centrifugal liquid separator and in combination, a hood for the separator bowl, the said hood having a reduced neck portion, a cover plate, said cover plate having a reduced neck portion fitting within the reduced neck portion of the said hood in such a manner as to provide separate cream and skimmed milk chambers between said parts, a central intake pipe passing through the tops of the reduced neck portions of the said hood and cover plate and a plug in the top of the reduced neck portion of the said hood, there being a cream discharge opening provided in the top of the reduced neck portion of the cover plate in a position juxtaposed to the said plug, so that the position of the plug in the hood regulates the flow of cream through the opening in the said cover plate.

7. In a centrifugal liquid separator and in combination, a hood for the separator bowl, the said hood having a reduced neck portion, a cover plate, said cover plate having a reduced neck portion fitting within the reduced neck portion of the said hood in such a manner as to provide a skimmed milk passage between said parts, a plug in the top of the reduced neck portion of the said hood, there being a cream discharge opening provided in the reduced neck portion of the cover plate in a position juxtaposed to the said plug, and a pin secured to the said plug, passing through the said cream discharge aperture in the reduced neck portion of the cover plate to control the flow of cream therethrough.

8. In a centrifugal liquid separator and in combination, a hood for the separator bowl, the said hood having a reduced neck portion, a cover plate, said cover plate having a reduced neck portion fitting within the reduced neck portion of the said hood in such manner as to provide a skimmed milk passage between said parts, a plug in the top of the reduced neck portion of the said hood, there being a cream discharge opening provided in the top of the reduced neck portion of the cover plate in a position juxtaposed to the said plug, and a pin secured to the said plug and adapted to enter the said cream discharge aperture in the top of the reduced neck portion of the cover plate so that the position of the said pin and plug relatively to the said cream discharge aperture control and determine the flow therethrough.

In witness whereof, we have hereunto signed our names in the presence of two subscribing witnesses.

JOHANNES VALDEMAR MÅRTEN RISBERG.
GUSTAF WILHELM JOHANSSON.

Witnesses:
ANNA SÖDERSTRÖM
ROBERT APELGREN